US012698837B2

(12) United States Patent　　　　　　(10) Patent No.:　　US 12,698,837 B2
　　Reau et al.　　　　　　　　　　　　　(45) Date of Patent:　　　　Aug. 4, 2026

(54) SECURING A PLUG ASSEMBLY IN A VALVE

(71) Applicant: Dresser, LLC, Houston, TX (US)

(72) Inventors: Aurelien Thomas Jules Reau, Flers
　　　　　　(FR); Romain Francois Pierre Chenu,
　　　　　　Conde-sur-Noireau (FR); **Valentin
　　　　　　Mercier, Flers (FR); Mickael Olaya**,
　　　　　　Valdalliere (FR)

(73) Assignee: Dresser, LLC, Houston, TX (US)

( * ) Notice:　　Subject to any disclaimer, the term of this
　　　　　　patent is extended or adjusted under 35
　　　　　　U.S.C. 154(b) by 0 days.

(21) Appl. No.: 18/885,806

(22) Filed:　　Sep. 16, 2024

(65)　　　　　　Prior Publication Data

US 2026/0078827 A1　　　Mar. 19, 2026

(51) Int. Cl.
　　*F16K 5/06*　　　　　　(2006.01)
(52) U.S. Cl.
　　CPC ..........　*F16K 5/0626* (2013.01); *F16K 5/0605*
　　　　　　　　　　　　　　　　　　　(2013.01)
(58) Field of Classification Search
　　CPC .... F16K 5/0626; F16K 5/0605; F16K 5/0647;
　　　　　　F16K 3/22; F16K 1/2028; F16K 1/2035
　　USPC ..................................... 251/298–303, 315.08
　　See application file for complete search history.

(56)　　　　　　References Cited

U.S. PATENT DOCUMENTS

| | | | | |
|---|---|---|---|---|
| 3,528,448 A | * | 9/1970 | Urban ................... | F16K 5/0642 |
| | | | | 251/173 |
| 3,860,032 A | * | 1/1975 | Rogers ..................... | F16K 5/10 |
| | | | | 251/315.08 |
| 4,519,412 A | | 5/1985 | Grazioli | |
| 6,302,374 B1 | | 10/2001 | Fink | |
| 6,367,771 B1 | | 4/2002 | Mazot | |
| 10,962,122 B2 | | 3/2021 | Lovell | |
| 2012/0168661 A1 | * | 7/2012 | Yin ........................... | F16K 5/12 |
| | | | | 251/315.16 |
| 2018/0142798 A1 | | 5/2018 | Pintauro et al. | |
| 2018/0306333 A1 | * | 10/2018 | Robinson .............. | F16K 5/0626 |

FOREIGN PATENT DOCUMENTS

| | | | | | |
|---|---|---|---|---|---|
| CN | 102322536 A | * | 1/2012 | ............. | F16K 5/204 |
| CN | 103016776 A | * | 4/2013 | ............. | F16K 5/204 |
| CN | 203421202 U | | 2/2014 | | |
| CN | 103711930 A | | 4/2014 | | |
| CN | 110735941 A | * | 1/2020 | .......... | F16K 27/067 |
| KR | 100928419 B1 | | 11/2009 | | |
| KR | 101894948 A1 | | 4/2018 | | |
| KR | 102013578 B1 | | 8/2019 | | |

OTHER PUBLICATIONS

Fisher, "Fisher V500 Rotary Globe Control Valve," 2018.
Valmet Flow Control Oy, "Neles RotaryGlobe Rotary control valve
Series ZX," 2024.

* cited by examiner

*Primary Examiner* — Marina A Tietjen
(74) *Attorney, Agent, or Firm* — Paul Frank + Collins
P.C.

(57)　　　　　　ABSTRACT

A plug assembly is configured for use in a valve. These
configurations may include a plug with a sealing surface that
can interface with a seat to regulate flow of fluid through the
valve. A keyed shaft may insert into the plug. The keyed
shaft can rotate to change location of key members in the
plug. In one implementation, a technician can rotate the
keyed shaft from a first position to a second position at
which the key members couple the plug with the valve body.

19 Claims, 8 Drawing Sheets

SECURING A PLUG ASSEMBLY IN A VALVE

BACKGROUND

Flow controls play a significant role in many industrial settings. Power plants and industrial process facilities, for example, use different types of flow controls to manage flow of material, typically fluids, throughout vast networks of pipes, tanks, generators, and other equipment. Valves are a type of flow control that operators favor to regulate flow of material (or "process fluid") on their process lines. These devices may comprise a valve body that houses valve "trim" that includes parts like a cage, a closure member, and a seat. A superstructure like a bonnet (or cover) may secure to the valve body. The bonnet may have a through-bore to receive a valve stem that connects the closure member to an actuator. Packing material may reside in the through-bore and surround the valve stem to prevent any leak of process fluid that might escape the valve body into the through-bore.

SUMMARY

The subject matter of this disclosure relates to improvements to construction of valves and other flow controls. Of particular interest are embodiments of a control valve that does not require any collateral openings to assemble the device. This feature avoids any additional seals or seal systems, which in turn eliminates potential leak paths on the valve.

DRAWINGS

This specification refers to the following drawings.

Figure 1:
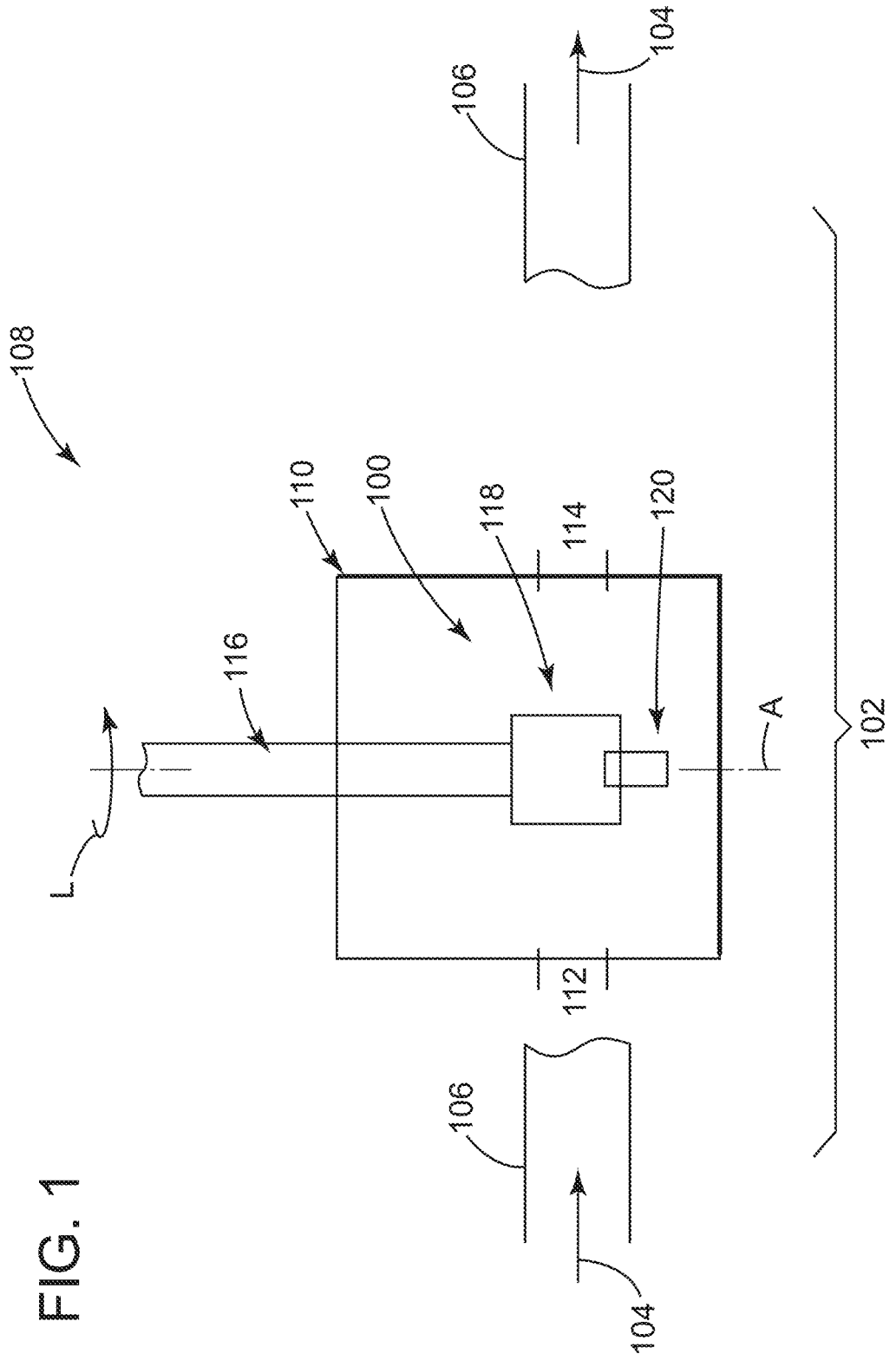
FIG. 1 depicts a schematic diagram of an exemplary embodiment of a plug assembly.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" does not exclude the existence of additional embodiments or implementations that also incorporate the recited features.

DESCRIPTION

The discussion now turns to describe features of the examples shown in the drawings noted above. These features may find use in a variety of different types of control valves, including rotary valves, linear valves, three-way valves, and the like. Rotary valves are a type of control valve that leverages rotary movement or motion to regulate flow through the device. Conventional designs for rotary valves often include "collateral" openings in addition to openings that make up its flow path. The collateral openings provide access points that allow technicians to install or assemble parts in the interior of the. But while necessary for assembly, the valve requires sealing systems that seal the collateral openings to prevent leaks of material out of the device. These systems can add extra cost and complexity to the valve, nominally because they add parts and labor. On the other hand, the proposed designs may allow technicians to secure parts inside of the valve through openings that exist as part of its flow path. Other examples and embodiments are within the scope of this disclosure.

FIG. 1 depicts a schematic diagram of an exemplary embodiment of a plug assembly 100. This embodiment is found in a distribution network 102, typically designed to carry material 104 through conduit 106. The plug assembly 100 is part of a flow control 108 that may integrate into the network 102. As shown, the flow control 108 may include a valve body 110 with openings (e.g., an inlet 112 and an outlet 114). A valve stem 116 may extend into the valve body 110. In one implementation, the plug assembly 100 may have a plug 118 that couples with the valve stem 116. A keyed shaft 120 that may lock the plug 118 into the valve body 110. The keyed shaft 120 may create an axis of rotation A about which the plug 118 can rotate in the valve body 110 in response to movement of the valve stem 116.

Broadly, the plug assembly 100 may be configured to simply assembly of the control valves. These configurations may employ parts that interlock with one another to secure them in their positions in the control valve. Designs for control valves can leverage these parts to eliminate certain openings or access points that function (often solely) to allow technicians to hold or handle parts inside of the control valve as they complete the assembly. This feature, in turn, may result in control valves that are less likely to leak or vent material because there are fewer areas that require seals or sealing systems.

The distribution system 102 may be configured to deliver or move fluids. These configurations may embody vast infrastructure. Material 104 may comprise gases, liquids, solid-liquid mixes, or liquid-gas mixes, as well. The conduit 106 may include pipes or pipelines that often connect to pumps, boilers, and the like. The pipes 106 may also connect to tanks or reservoirs. In many facilities, this equipment forms complex networks to execute a process, like refining raw materials or manufacturing a product.

The flow control 108 may be configured to regulate flow of material 104 through the conduit 106 in these complex networks. These configurations may include rotary valves; but this disclosure does not limit the concepts here to just those devices. The valve body 110 in these devices is often made of cast or machined metals. This part may have flanges or another connective feature at the openings 112, 114. Adjacent pipes 106 may connect or bolt to these flanges to allow material 104 to flow into and out of the device. The valve stem 116 may embody an elongated member, for example, a metal rod or shaft that can direct a rotative load L from a actuator to the plug assembly 100. This shaft may have a cross-section that is round or circular; but other shapes may find use in certain applications as well.

The plug 118 may be configured to regulate flow through the valve body 110. These configurations may include a body that interfaces with other parts, like a seat, that reside on the flow control 108. Movement of this "plug" body can change flow through the seat. In rotary valves, the plug body may rotate about an axis A in response to load L on the valve stem 116.

The keyed shaft 120 may be configured to couple the plug 118 to the valve body 110. These configurations may include parts that provide one or more degrees of freedom for the plug 118. As noted herein, this degree of freedom may allow the plug 118 to rotate relative the seat. This part may also have features that engage with the valve body 110 and the plug 118 to facilitate assembly of the flow control 108. In one implementation, these features are releasable, requiring only a tool (like a screwdriver) to engage the parts 118, 120 together in the flow control 108.

Figure 2:
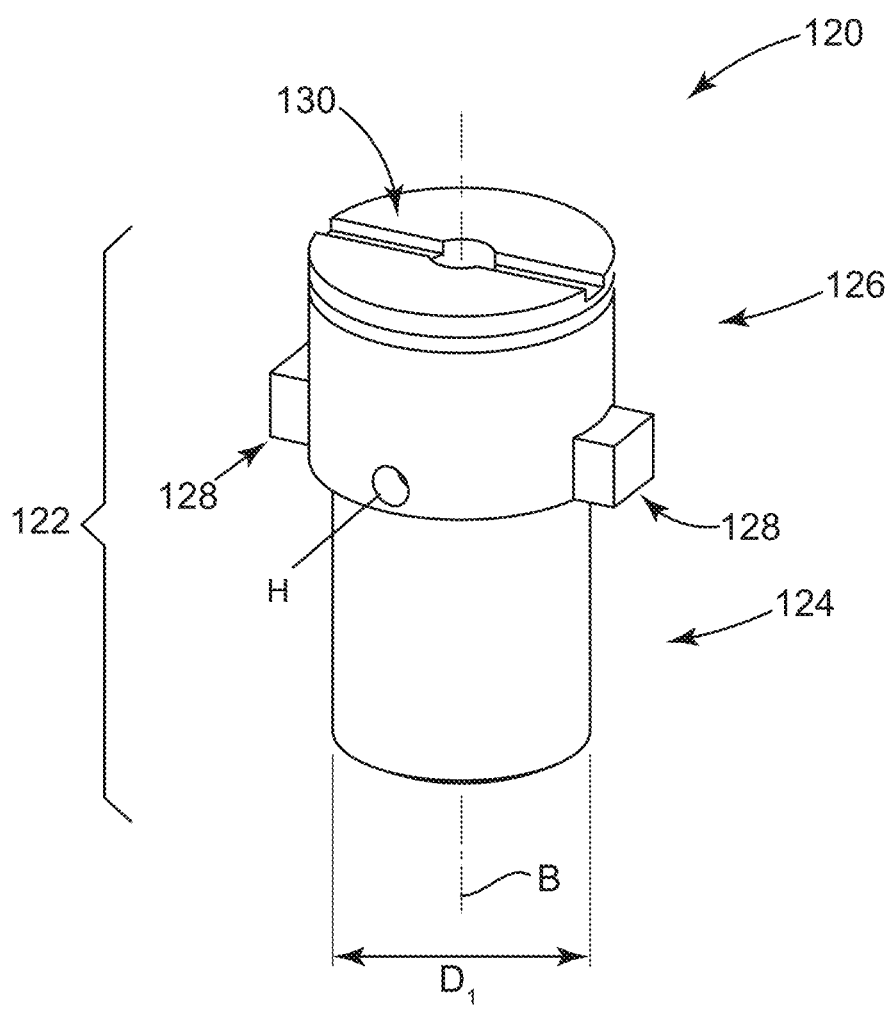
FIG. 2 depicts a perspective view of an example of a keyed shaft for use in the plug assembly of FIG. 1.

FIG. 2 depicts a perspective view of an example of structure for the keyed shaft 120. This example includes a cylindrical body 122 with a diameter $D_1$ that may vary along its longitudinal axis B. The variations may form a shaft portion 124 and a key portion 126. As shown, the key portion 126 may include key members, for example, one or more protrusions 128 that extend radially outward from the outer surface of the cylindrical body 122. In one implementation, the protrusions 128 are diametrically opposed to one another relative to the axis B. The cylindrical body 122 may also include a slot 130 that extends across its top, either fully or partially. The slot 130 may have dimensions (e.g., depth, width, length, etc.) to accommodate tools, like a screwdriver, that an end user may use to assemble the flow control 108. As also shown, the body 122 may include a first alignment feature, for example, a hole H disposed on its outer surface. This feature may work in combination with a second alignment feature on the plug 118 (FIG. 1) to indicate to an end user that the keyed shaft 120 is in proper position to secure the plug 118 (FIG. 1) in the body 110 (FIG. 1).

FIGS. 3, 4, 5, and 6 depict an example of structure for the plug 118. The cylindrical body 122 (FIG. 2) may engage with this structure to couple the plug 118 to the valve body 110 (FIG. 1). In one implementation, the structure forms areas that allow technicians to insert and manipulate the cylindrical body 122 (FIG. 2). These areas can capture the key members on the cylindrical body 122 (FIG. 2) to prevent certain movement of the plug 118 relative to the valve body 110.

Figure 3:
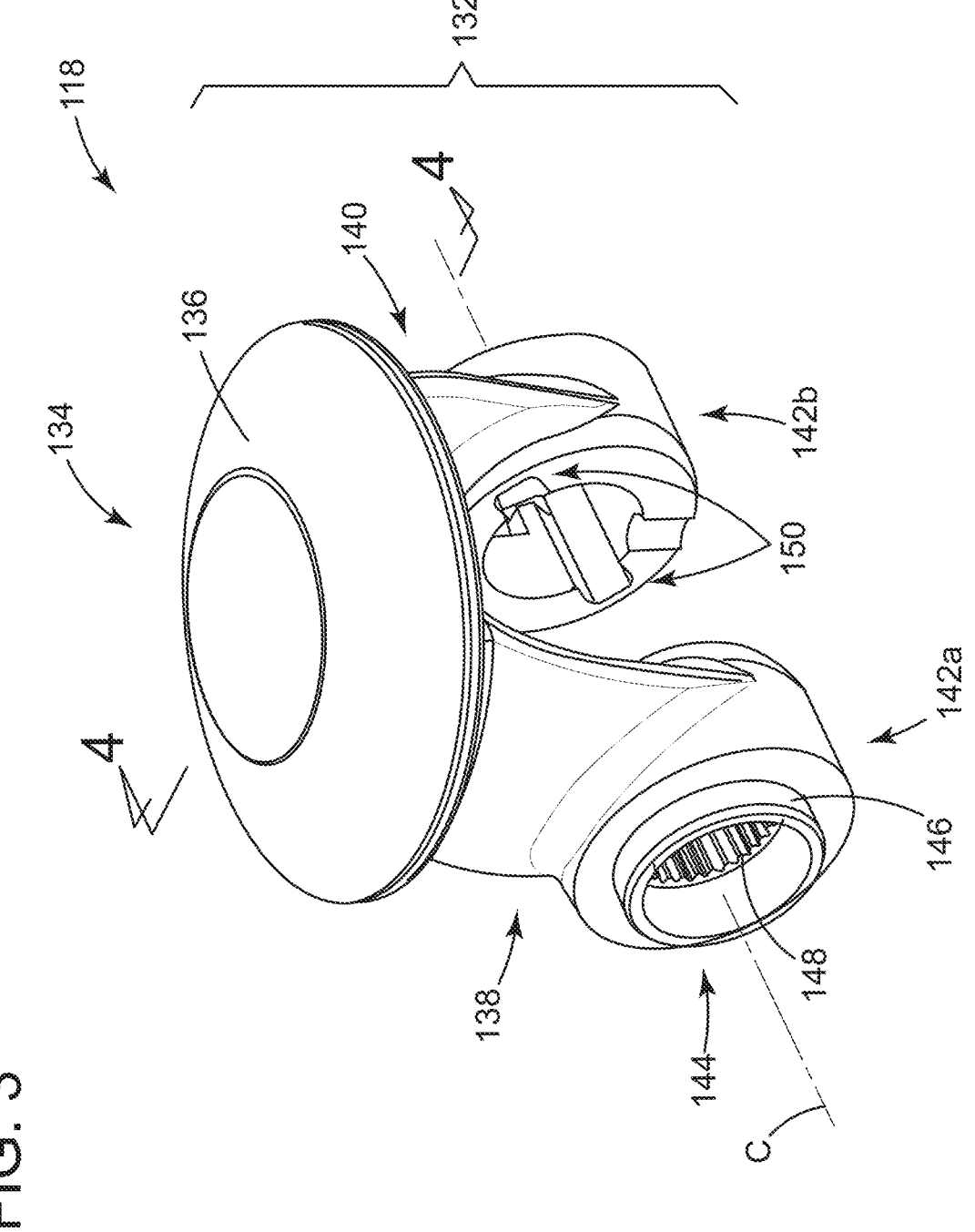
FIG. 3 depicts a perspective view of an example of a plug for use in the plug assembly of FIG. 1.

FIG. 3 depicts a perspective view from the top and side of this structure. The plug 118 may have a plug body 132 that adopts a yolk-style design. The plug body 132 may include a disc 134, preferably round with a spherical sealing surface 136. Legs 138, 140 may extend from the disc 134. Each of the legs 138, 140 may terminate at a cylindrical member 142, which may embody a bushing or like element. In one implementation, the bushing 142 may have a through-bore 144 that forms an axis C. On the first (or upper) leg 138, the "upper" plug bushing 142a may have a protrusion 146 that extends longitudinally along the axis C. Splines 148 or similar features may populate the inner surface of the through-bore 144. These features can engage with similar features on the valve stem 116. On the second (or lower) leg 140, the "lower" plug bushing 142b may include a first set of slots 150 that penetrate from the top and extend longitudinally along axis C on the inner surface of the through-bore 144. As best shown in the cross-section of FIG. 4, the slots 150 may penetrate through the lower plug bushing 142b.

Figure 4:
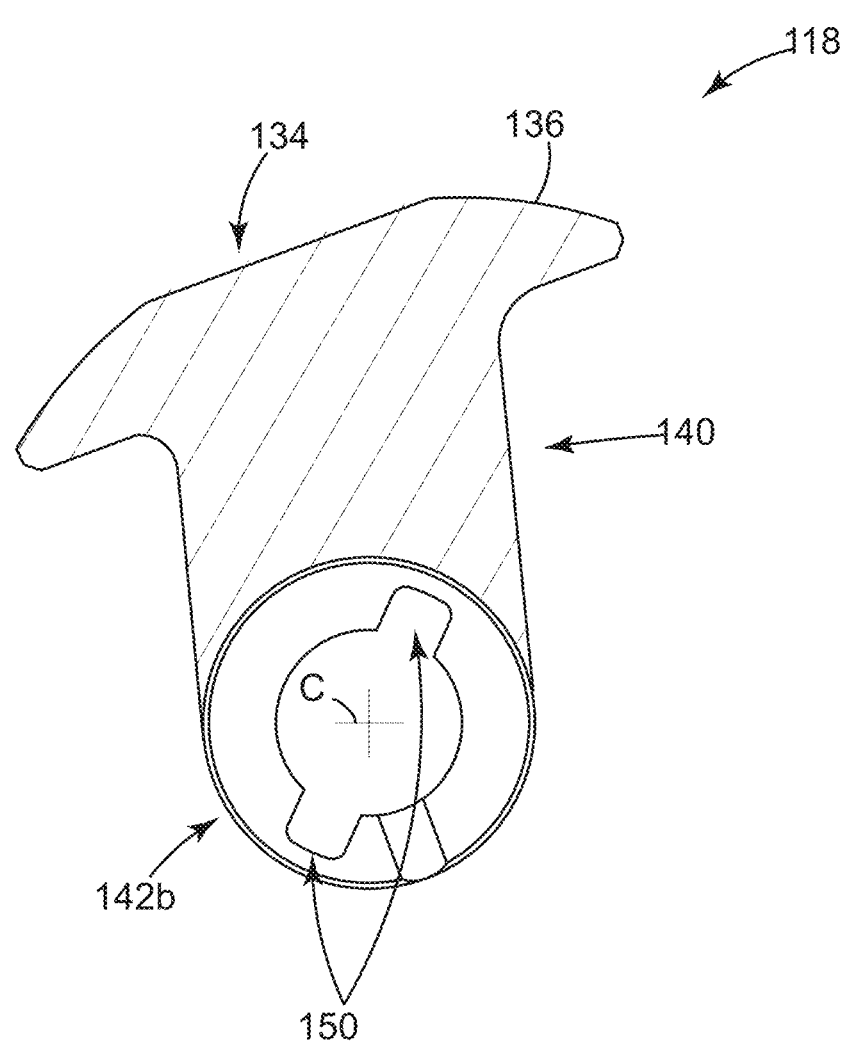
FIG. 4 depicts an elevation view of the cross-section of the plug of FIG. 3.
Figure 5:
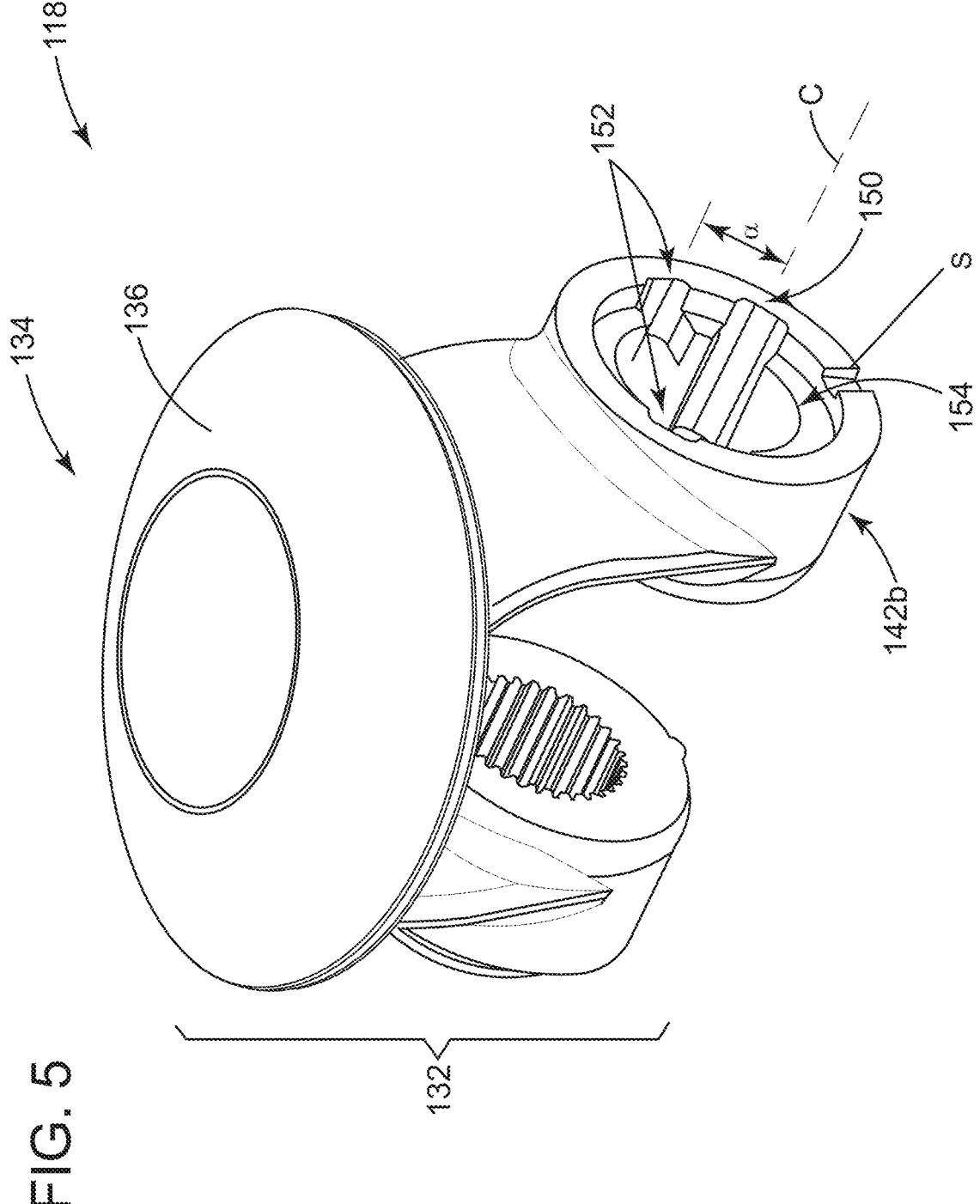
FIG. 5 depicts a perspective view of the plug of FIG. 3.
Figure 6:
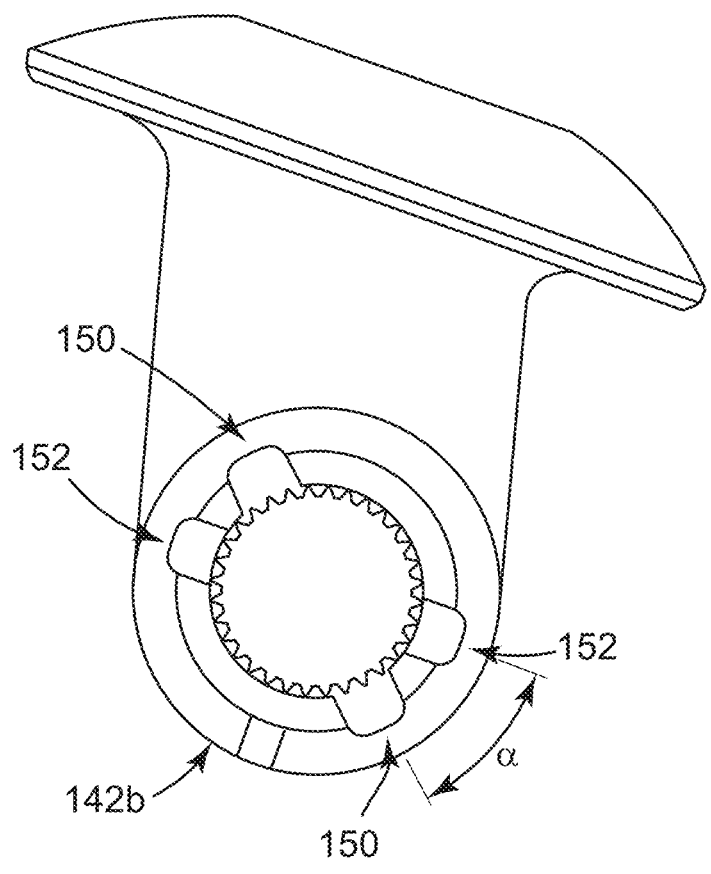
FIG. 6 depicts an elevation view of the plug of FIG. 3.

FIG. 5 depicts a perspective view from the bottom and side of the plug body 132 of FIGS. 3 and 4. The lower plug bushing 142b may include a second set of slots 152 that penetrate from the bottom. The slots 152 may terminate within the lower plug bushing 142b, for example, less than midway into the length of the bushing. A counter-bore 154 may penetrate from the bottom as well. The second alignment feature may embody a slot S in the bottom of the lower plug bushing 142b. As best shown in the elevation view of FIG. 6, the slots 150, 152 may be angularly offset from one another about the axis C by an angle α.

Figure 7:
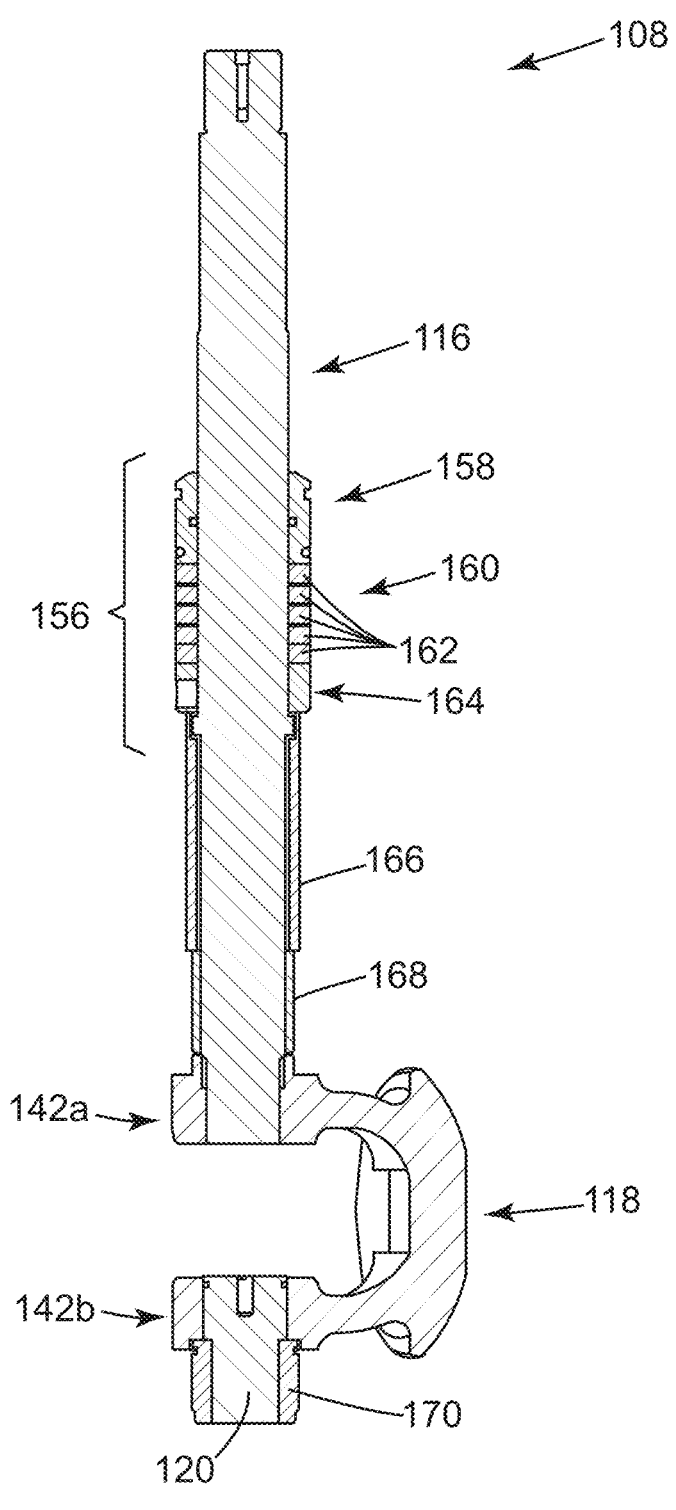
FIG. 7 depicts an elevation view of the cross-section of an example of a flow control that includes an example of the plug assembly of FIG. 1.

FIG. 7 depicts an elevation view of the cross-section of an example of structure for the flow control 108. Parts of the flow control 108 are missing for clarity. The valve stem 116 may extend into (and through) a packing assembly 156, shown here to include a packing follower 158 that resides adjacent packing material 160. Examples of the packing material 160 may include a stack of packing rings 162. A bushing 164 may reside at the bottom of the stack 162. In one implementation, the flow control 108 may include a spacer tube 166 that resides below the bushing 162. The spacer tube 166 may embody a hollow sleeve that circumscribes or surrounds the valve stem 116. In one implementation, the device may also include guide bushings 168, 170 adjacent the upper and lower plug bushings 142a, 142b of the plug 118. The upper guide bushing 168 may contact or reside on the protrusion 146 of the upper plug bushing 142a on the upper leg 138. The lower guide bushing 170 may insert into the counter-bore 154 of the lower plug bushing 142b of the lower leg 140.

Figure 8:
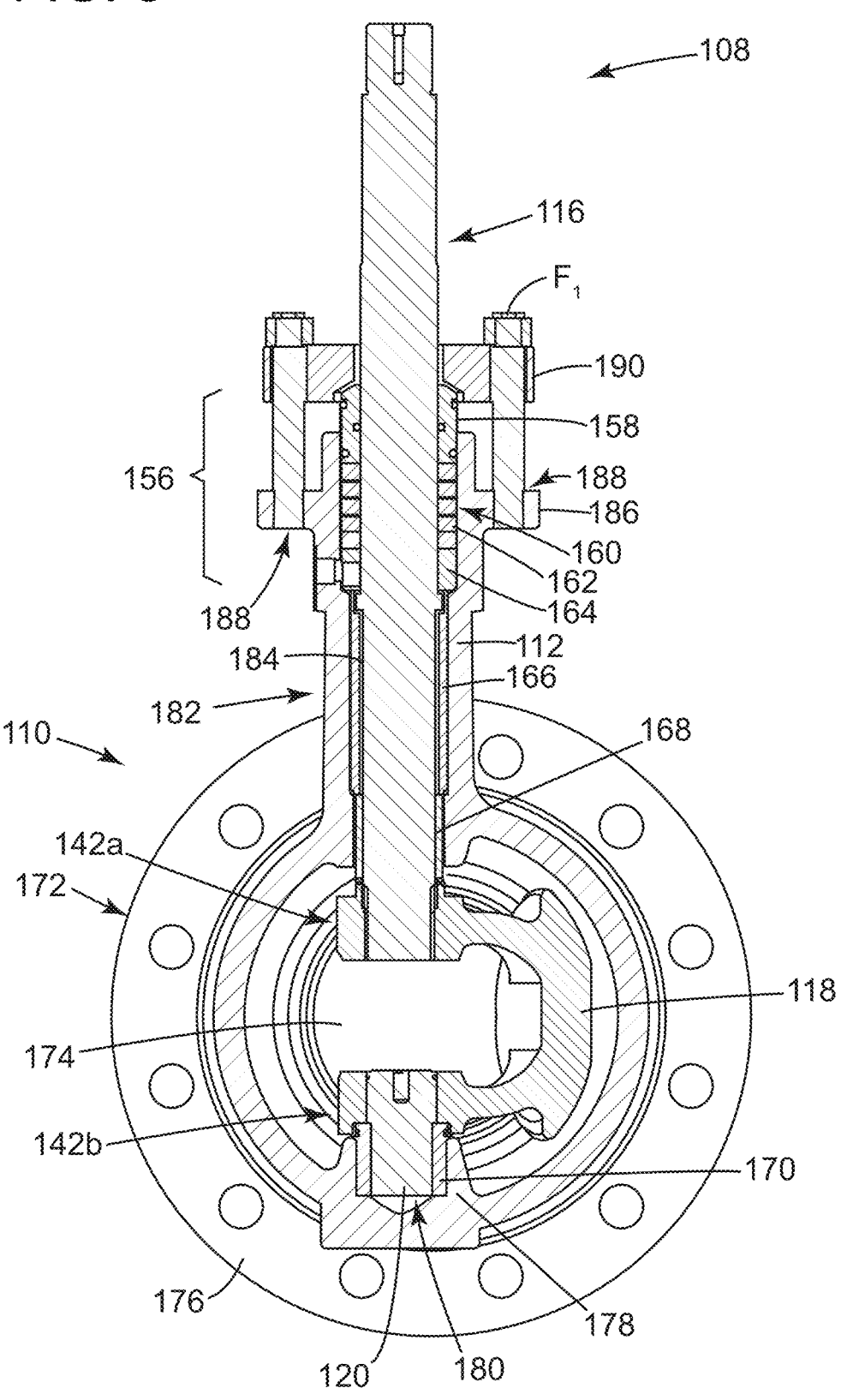
FIG. 8 depicts an elevation view of the cross-section of the flow control of FIG. 7.

FIG. 8 depicts an elevation view of the cross-section of the example of FIG. 7. This example also includes the valve body 110, shown here as a fluid coupling 172 that forms a flow path 174 with flanged, open ends 176. The fluid coupling 172 may enclose the valve mechanics, like the plug 118. This structure may be useful to regulate process fluids in industrial process lines typical of industries that focus on chemical production, refining production, and resource extraction. In one implementation, the fluid coupling 172 may also include a boss 178 inside or within the flow path 174. The boss 178 may have a bore 180. An elongate neck portion 182 may extend generally upwardly, typically as an integral part of the fluid coupling 172. The neck portion 182 may have a bore 184 to receive the spacer tube 166 and upper guide bushing 168. The neck portion 182 may also have shoulder portion 186 with threaded holes 188 to receive fasteners $F_1$ that secure a follower clamp 190 to the fluid coupling 172.

With reference to the foregoing FIGS. 2, 3, 4, 5, 6, 7, and 8, the exemplary structure can simplify assembly of the flow control 118. A technician can insert the lower guide bushing 170 into the bore 180 and then locate the plug body 118 inside the flow path 174 with the lower plug bushing 142b of the lower leg 140 adjacent the lower guide bushing 170. The technician can then insert the keyed shaft 120 into the lower plug bushing 142b on the lower leg 140, aligning the protrusions 128 with slots 150. This position allows the keyed shaft 120 to slide downwardly into the lower plug bushing 142b on the lower leg 140 to locate the shaft portion 124 in the lower guide bushing 170. In one implementation, the keyed shaft 120 will contact the top of the lower guide bushing 170 and locate the protrusions 128 within the counter-bore 154 of the lower plug bushing 142b on the lower leg 140. Using a tool, the technician can then engage the slot 130 on top of the keyed shaft 120. This feature allows the technician to turn the keyed shaft 120 (about the axis A, B, C) to angularly change position of the protrusions 128 from, for example, a first position at the slots 150 to a second position at the slots 152. The hole H may align with the slot S to visually indicate that the second position to the technician. In one implementation, this second position secures the keyed shaft 120 in the plug 118 and prevents axially movement of the keyed shaft 120. The key portion 126, in turn, supports the lower plug bushing 142*b*. Technicians can assemble the remaining parts of the flow control 108 so that the valve stem 116 engages with splines 148 of the upper plug bushing 142*a* of the upper leg 138.

Considering the foregoing, the improvements noted herein simplify assembly of control valves. These improvements eliminate certain features, namely, openings in the control valve that technicians needed only to assembly parts on the interior of the device. The proposed design, on the other hand, does not require these additional or collateral openings because technicians can assembly all the parts through existing openings (like the inlet and outlet openings for the flow path) in the control valve.

This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A valve, comprising:
a valve body having a flow path;
a boss disposed in the flow path; and
a plug assembly coupled to the boss, the plug assembly comprising,
    a plug having a first bushing with a top and a bottom and a bore extending therethrough, the plug comprising a first longitudinal slot extending from the top to the bottom in the bore and a second longitudinal slot extending from the bottom and terminating within the first bushing; and
    a keyed shaft extending into each of the boss and the first bushing, the keyed shaft comprising at least one protrusion that fits into the first longitudinal slot and the second longitudinal slot.

2. The valve of claim 1, further comprising:
a counterbore in the first bushing that is concentric with the bore.

3. The valve of claim 1,
wherein the second longitudinal slot is angularly offset from the first longitudinal slot.

4. The valve of claim 1, further comprising:
a counterbore in the first bushing that is concentric with the bore and forms a bottom surface, wherein the the second longitudinal slot begins at the surface of the counterbore.

5. The valve of claim 1, further comprising:
a second bushing on the plug that is spaced apart from the first bushing.

6. The valve of claim 1, further comprising:
a second bushing on the plug that is spaced apart from the first bushing, the second bushing having a longitudinal bore with splines disposed therein.

7. The valve of claim 1, further comprising:
a transverse slot in the keyed shaft.

8. The valve of claim 1, wherein the plug comprises a disc with a spherical sealing surface.

9. The valve of claim 1, wherein the plug comprises a disc with a spherical sealing surface and a leg that extends away from the disc and terminates at the first bushing.

10. The valve of claim 1, wherein the plug comprises a disc with a spherical sealing surface and a first leg and a second leg that extend away from the disc and terminate at the first bushing and a second bushing, respectively.

11. A valve plug, comprising:
a disc;
a first leg and a second leg extending away from the disc; and
a first bushing and a second bushing disposed on a free end of the first leg and the second leg, respectively,
wherein the first bushing has a first end and a second end, and
wherein the first bushing comprises a first longitudinal bore with a first longitudinal slot and a second longitudinal slot,
wherein the first longitudinal slot extends from the first end to the second end, and
wherein the second longitudinal slot extends from the second end and terminates before the first end.

12. The valve plug of claim 11, further comprising:
a counterbore concentric with the first longitudinal bore.

13. The valve plug of claim 11, further comprising:
a second longitudinal slot that is angularly offset from the first longitudinal slot.

14. The valve plug of claim 11, further comprising:
a second longitudinal slot that is angularly offset from the first slot,
wherein the second longitudinal slot is shorter than the first longitudinal slot.

15. The valve plug of claim 11, wherein the second bushing has a second longitudinal bore with splines formed therein.

16. The valve plug of claim 11, wherein the disc forms a spherical sealing surface.

17. A method, comprising:
providing a valve body with a boss disposed in an interior cavity, the boss having a bore;
providing a valve plug with a bushing having a top, a bottom, and a bore extending therethrough, the bore having a first longitudinal slot and a second longitudinal slot, the first longitudinal slot extended from the top to the bottom and the second longitudinal slot extending from the bottom and terminating between the top and the bottom;
securing the valve plug in the interior cavity with a keyed shaft that extends into part of the valve plug and the bore,
wherein the keyed shaft is rotatable in the valve plug so as to change position of a key member from a first position that allows the keyed shaft to exit from the valve plug to a second position that prevents the keyed shaft from exiting the valve plug.

18. The method of claim 17, wherein the second position prevents the valve plug from exiting the valve body.

19. The method of claim 17, wherein the second position prevents the valve plug from exiting the valve body but allows the valve plug to rotate relative to the bore in the boss.

* * * * *